No. 651,250. Patented June 5, 1900.
C. H. HOWLAND-SHERMAN & A. M. BENNETT.
ANTISEPTIC FOOD COOLER.
(Application filed Feb. 19, 1900.)
(No Model.) 2 Sheets—Sheet 1.

WITNESSES: INVENTORS

No. 651,250. Patented June 5, 1900.
C. H. HOWLAND-SHERMAN & A. M. BENNETT.
ANTISEPTIC FOOD COOLER.
(Application filed Feb. 19, 1900.)
(No Model.) 2 Sheets—Sheet 2.
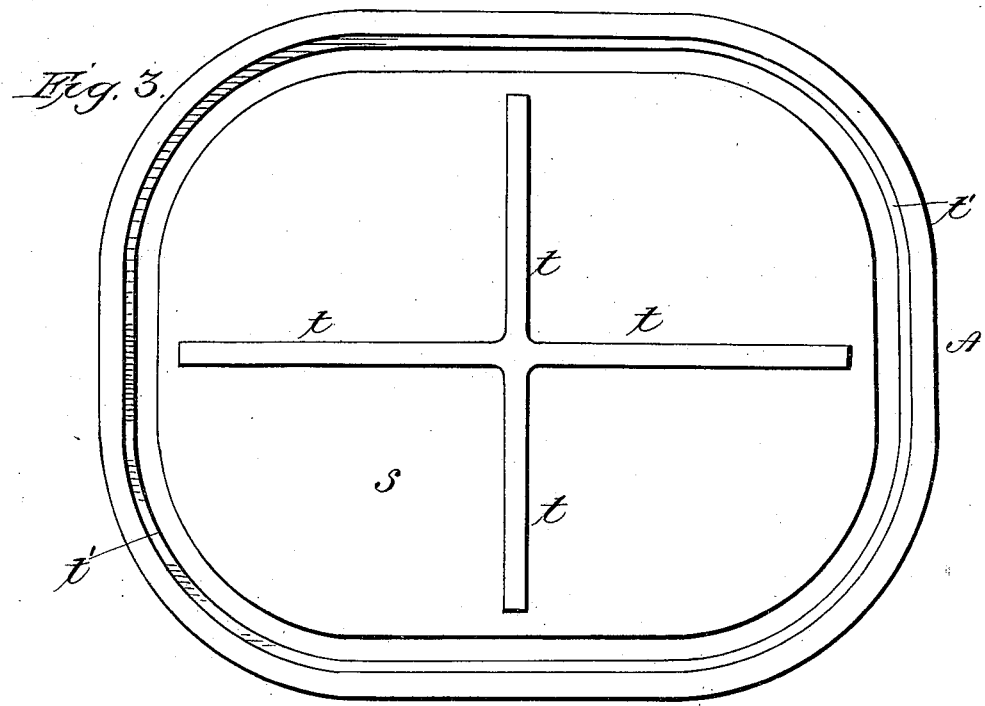
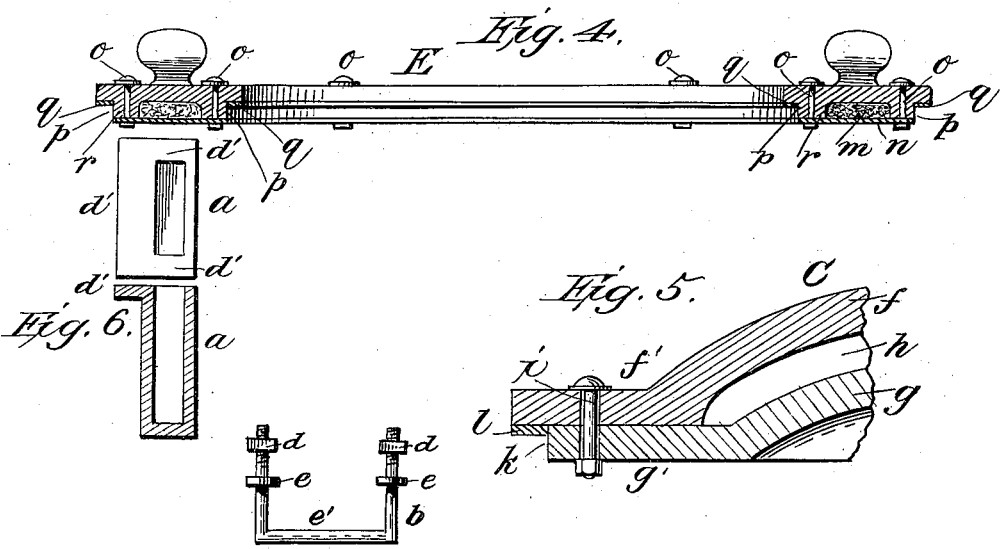
WITNESSES:
INVENTORS
BY
ATTORNEY

UNITED STATES PATENT OFFICE.

CHARLES H. HOWLAND-SHERMAN AND ALAN M. BENNETT, OF WASHINGTON, DISTRICT OF COLUMBIA, ASSIGNORS OF THREE-FOURTHS TO AGNES S. ADAM, OF SAME PLACE.

ANTISEPTIC FOOD-COOLER.

SPECIFICATION forming part of Letters Patent No. 651,250, dated June 5, 1900.

Application filed February 19, 1900. Serial No. 5,725. (No model.)

*To all whom it may concern:*

Be it known that we, CHARLES H. HOWLAND-SHERMAN and ALAN M. BENNETT, citizens of the United States, residing at Washington, in the District of Columbia, have invented certain new and useful Improvements in Antiseptic Food-Coolers; and we do hereby declare the following to be a full, clear, and exact description of the invention, such as will enable others skilled in the art to which it appertains to make and use the same.

Our invention relates to the preservation of articles of food, and has especial reference to means for preserving food in hot climates, by the use of antiseptics to destroy microbes and other deleterious animal matter, and a cooling medium to maintain a low degree of temperature; and it consists in certain improvements in construction which will be fully disclosed in the following specification and claims.

Figure 1:
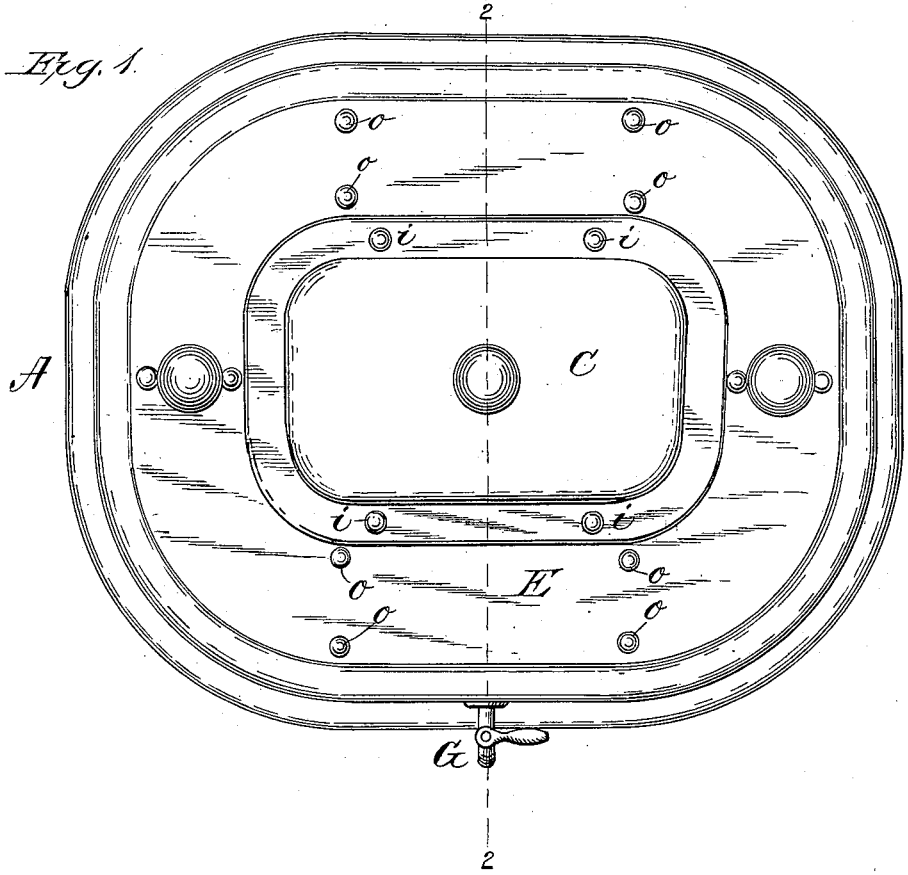
Figure 2:
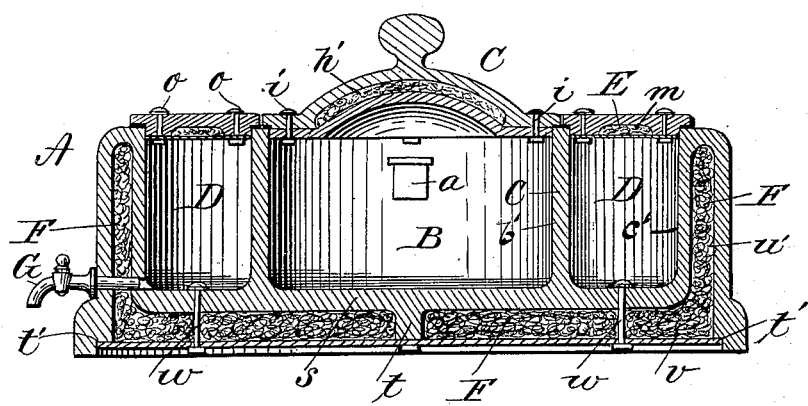

In the accompanying drawings, which form part of this specification, Figure 1 represents a top plan view of our invention; Fig. 2, a vertical longitudinal section; Fig. 3, an inverted plan with the retention-plate removed; Fig. 4, a vertical longitudinal section of the cover for the chamber for a cooling medium; Fig. 5, an enlarged detail sectional view of the cover for the food-cooler; Fig. 6, a top plan and a vertical section of the antiseptic-receptacle on an enlarged scale; and Fig. 7, a top plan view of the support for the antiseptic-receptacle, also on an enlarged scale.

Reference being had to the drawings and the letters thereon, A indicates the body of our improved food-cooler, having a central chamber B to receive articles of food to be preserved, and is provided with a receptacle $a$ to receive an antiseptic, such as suitable chlorids, well known, for the purpose of destroying microbes and other deleterious animal matter, and is supported upon a U-shaped holder $b$ with its open upper end near the upper end of the chamber B. The holder extends through the wall $c$ of the chamber B and is secured by nuts $d\,d$, which engage one side of the wall, and collars $e\,e$, which engage the opposite side. The receptacle $a$ is provided with a flange $d'$ at its upper end, which rests upon the holder and prevents it falling through the loop $e'$ in the holder. The chamber B is provided with a cover C, formed of two pieces $f\,g$, provided with horizontal flanges $f'\,g'$, which rest upon each other, with a chamber $h$ between the parts $f\,g$ to receive a non-conductor of heat—such as wool, felt, or suitable material $h'$—and the pieces are secured together by bolts $i$, which pass through the flanges $f'\,g'$ and have a rabbet $k$ around the lower flange $g'$ and a packing $l$, of leather, paper, or other material, cemented to the lower side of the projecting part of flange $f'$, as shown in Figs. 2 and 5. The lower flange $g'$ of the cover loosely enters the chamber B, allowing the packing $l$ of the flange $f'$ to form an air-tight joint around the upper edge of the food-chamber, and rests upon the wall $b'$ between the food-chamber and the cooling-chamber.

D is an annular chamber surrounding the chamber B for containing a suitable refrigerant—such as liquid air, liquid ammonia, or ice—and is provided with a removable annular cover E, provided with a chamber containing a non-conductor $m$ and an annular retention-plate $n$ for securing the non-conductor in the chamber. The plate $n$ is secured by bolts $o$, and on each edge of the cover is a rabbet $p$ and a packing $q$, the part $r$ of the cover entering the chamber D in the same manner as the corresponding parts of cover C enter chamber B and rests upon the walls $b'\,c'$ between the chambers.

The chambers B and D are separated by the vertical wall $b'$ and both open at the upper end of the cooler, and the cover of either one can be removed without interfering with the other.

F is a chamber surrounding and separated from the chamber D by a vertical wall $c'$, extends underneath both chambers B and D, and on the under side of the bottom $s$ of the chambers B and D are projecting ribs $t$, which strengthen the bottom and form a support for the retention-plate, and said chamber F is packed with a non-conductor of heat $u'$ of the kind used in the cover C or any preferred kind, and the non-conductor is retained in the chamber by a retention-plate $v$, secured by bolts $w$, extending through the bottom of the chamber D and resting against the ribs $t$ and upon ledge $t'$. This chamber F opens or is accessible from the bottom of the article and may be thoroughly packed with a non-conductor of heat and the base-plate applied.

The chamber D is provided with a faucet G for drawing off any liquid that may accumulate therein.

The cooler is designed to be made, preferably, of stone or pottery ware, the chambers, their fixed walls, and the bottom of the chambers B and D being integral to avoid leakage, with the inside of the chambers B and D glazed, and the retention-plates $n$ and $v$ are designed to be made of sheet metal, with the lower surface of the former enameled to prevent corrosion, the preferred form of the cooler being elongated, as shown, for the purpose of accommodating like forms of plates or dishes containing food to be preserved.

The cooler, which is designed for convenient manufacture in all sizes, can be advantageously utilized for a large variety of hospital and domestic uses, being readily portable and easily operated.

Having thus fully described our invention, what we claim is—

1. A cooler having a chamber for articles to be cooled provided with a receptacle for an antiseptic, a cooling-chamber separated from and surrounding the food-chamber, a chamber around the cooling-chamber and extending under the food and the cooling chamber, a non-conductor of heat filling the latter chamber, a cover for the food-cooling chamber resting upon the wall between said chamber and the cooling-chamber, and a separate annular cover for the cooling-chamber resting upon the same wall and the wall between said cooling-chamber and the chamber for the non-conductor.

2. A cooler having a chamber for articles to be cooled, a surrounding chamber for a cooling medium, a chamber surrounding the latter chamber, all of said chambers being separated by fixed integral walls, and the latter chamber provided with a non-conducting material, a non-conductor of heat under all of said chambers, a cover for the center chamber and a separate annular cover for the chamber containing the cooling medium.

3. A cooler having a chamber for articles to be cooled, a surrounding chamber for a cooling medium, accessible from the top of the cooler and provided with separate detachable covers, a chamber surrounding the latter chamber and accessible from the bottom of the cooler and all of said chambers being separated by fixed integral walls, and the latter chamber provided with a non-conducting material, a non-conducting material under all of said chambers, and a retention-plate in the bottom of the cooler.

4. A cooler having a chamber for articles to be cooled, a surrounding chamber for a cooling medium, separate detachable covers for said chambers provided with a non-conducting medium and resting upon the walls between said chambers, a chamber surrounding the latter chamber, and a chamber under all of said chambers, the concentric chambers being separated by fixed integral walls, and the latter chamber provided with a non-conductor of heat, and a retention-plate in the bottom of the cooler.

5. A cooler having a chamber for articles to be cooled, a concentric chamber for a cooling medium separated by a fixed integral wall, and a non-conductor of heat around the latter chamber and under both chambers, a retention-plate removable from the bottom of the cooler, and a removable cover made in two parts, provided with flanges by which the parts are secured together, separable horizontally and having a non-conductor of heat interposed between the two parts.

6. A cooler provided with a two-part cover having flanges by which the parts are detachably secured together and separable horizontally, one of which flanges extends beyond the other and forms a rabbet around the lower flange, and a chamber between said parts provided with a non-conductor of heat.

7. A cooler provided with an annular cover having a chamber in its lower side provided with a non-conductor of heat and having rabbets on both edges thereof extending around the cover, in combination with a cooling-chamber, a heat-non-conducting chamber, and a separable retention-plate in the bottom of said chamber, said cover resting upon the wall between the cooling-chamber and the heat-non-conducting chamber.

In testimony whereof we affix our signatures in presence of two witnesses.

CHARLES H. HOWLAND-SHERMAN.
ALAN M. BENNETT.

Witnesses:
D. C. REINOHL,
W. PARKER REINOHL.